May 29, 1928.  1,671,935
G. W. PRICE
TESTING DEVICE
Filed June 30, 1927    2 Sheets-Sheet 2
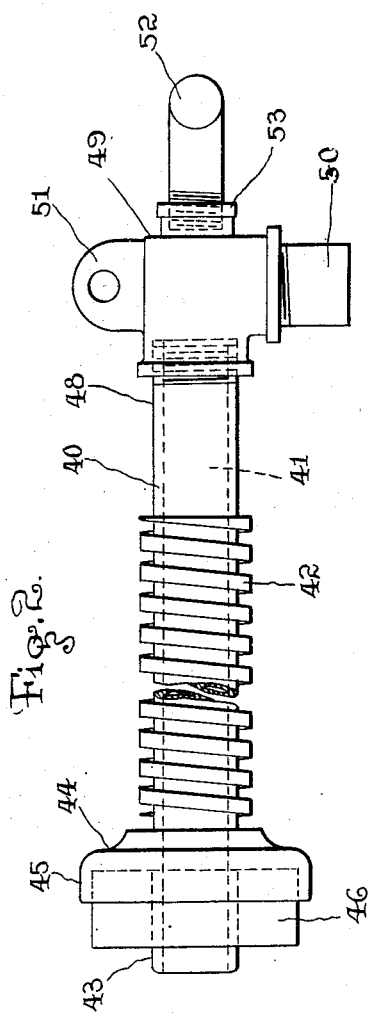
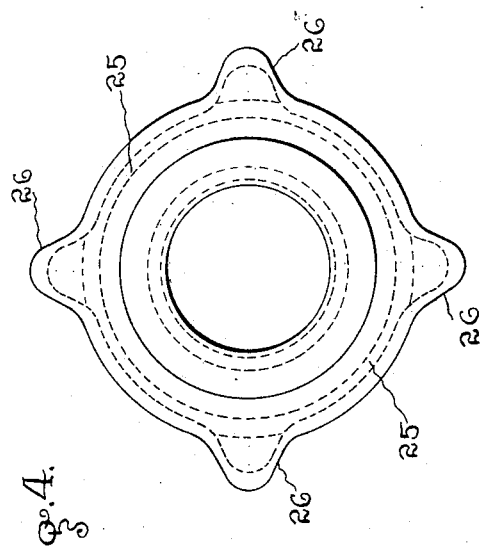
Glen W. Price Inventor
By his Attorney Patented May 29, 1928.

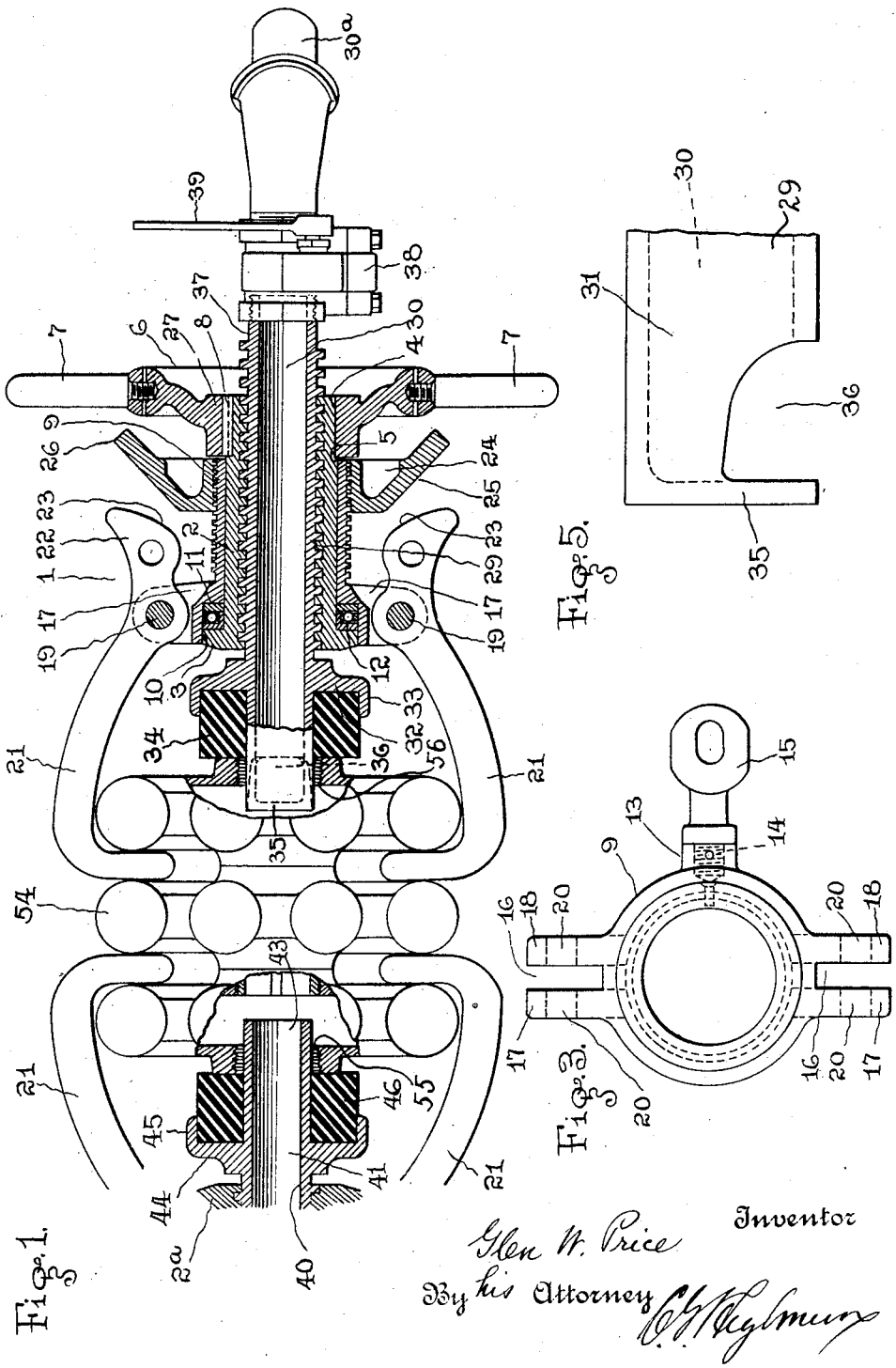

1,671,935

UNITED STATES PATENT OFFICE.

GLEN W. PRICE, OF BAYONNE, NEW JERSEY, ASSIGNOR TO AMERICAN RADIATOR COMPANY, OF NEW YORK, N. Y., A CORPORATION OF NEW JERSEY.

TESTING DEVICE.

Application filed June 30, 1927. Serial No. 202,478.

My invention relates to new and useful improvements in testing devices, and more particularly to a device for testing hollow articles, such, for example, as radiators.

An object of my invention is to provide a device which is of simple construction and efficient in operation.

Another object is to provide a device by which defects, whether in the formation, assembly, or otherwise, in the article to be tested can be easily and quickly detected.

The invention consists in the improved construction and combination of parts, to be more fully described hereinafter, and the novelty of which will be particularly pointed out and distinctly claimed.

In the accompanying drawings I have fully and clearly illustrated a preferred embodiment of my invention, to be taken as a part of this specification, and wherein—

Figure 1 is a plan view of a radiator to be tested, with parts broken away, and showing the plug end of my testing device in horizontal longitudinal central section, and a portion of the head end thereof also in horizontal longitudinal central section;

Fig. 2 is a view in side elevation of the conduit member forming part of the head end of my device;

Fig. 3 is an end view of a sleeve support;

Fig. 4 is an end view of a cam wheel, and

Fig. 5 is a detail view of the conduit member for the plug.

Referring to the drawings by characters of reference, 1 designates a test fitting having a substantially cylindrical support 2 which is internally threaded throughout its length. At one end of the support 2 is a circumferential flange or abutment 3. At its other end the support 2 is of decreased external diameter, as at 4, to form a shoulder 5. Mounted upon the part 4 is an operating member 6, preferably in the form of a wheel which is fixed to the support 2 by a key and registering keyways 8, or in any other suitable and well known manner, as by a set screw, or the like. The wheel 6 is preferably provided with radially projecting hand grips 7 which may be detachable from wheel 6, as shown, or may be formed integral therewith, if desired. Rotatably mounted on the support 2 is a sleeve 9 which at one end has its internal diameter enlarged, as at 10, to telescope the flange 3 and form an annular pocket 11 to receive a ball ring and balls 12 which serve as a thrust bearing between support 2 and sleeve 9. At the top of sleeve 9 I preferably provide a boss 13 having an internally threaded socket 14, into which is screwed a supporting eye 15 to which may be attached a chain, cable, or other member to support the fitting 1 at the proper working height from the floor. This end of the sleeve 9 has oppositely disposed, laterally projecting yokes 16, each having parallel spaced arms 17, 18. Between the arms 17, 18 of each yoke 16 is a pivot pin 19 which is fixed in openings 20 which are oppositely disposed in the arms of each yoke. On each pivot pin 19 is freely journaled a fastening member 21, preferably in the form of a hook, which has a rearwardly extending end 22 with a cam surface 23. The sleeve 9 is externally threaded to receive a cam wheel 24 which serves as an abutment and has a conical portion 25 and ears or hand grips 26. The sleeve 9 and cam wheel 24 are retained on the support 2 by the hub 27 of the operating wheel 6.

Threaded through the support 2 and in engagement with the internal thread thereof, above mentioned, is a conduit member 29, preferably tubular in form, having a longitudinal conduit or passage 30. Near the end 31 of member 29, which is adjacent the fastening means 21, is a cup-shaped flange fast on the member 29 and having a peripheral base or flange proper 32 to form a shoulder, and a side wall or laterally projecting ring 33 extending toward end 31. Seated against the base 32 and laterally retained by the wall 33, is a packing or sealing ring 34, preferably of rubber. At the end 31 of the conduit member, the conduit 30 is closed by a plate or baffle 35, and the conduit 30 opens between the plate 35 and packing means 34 through an aperture or hole 36 in the under or bottom side wall of member 29. At its other end 37 the member 29 has a valve 38 to open and close the conduit 30. Any suitable type of valve may be employed, but I prefer to use a valve of the gate type having an operating lever 39. A hose, pipe, or other conduit means (not shown), may be connected to the nipple 30ª to convey fluid from the conduit 30. This part of the device heretofore described comprises the plug fitting.

The head fitting differs from the plug fitting only in the conduit member which is threaded through the support 2. The head conduit member 40, shown in Fig. 2, is also preferably tubular in form, having a conduit or passageway 41 and an external thread 42 which engages the internal thread in a support 2ª, which is similar in all respects to the support 2 shown in Fig. 1. This conduit member 40 is also provided near one end 43 thereof with a cup-shaped flange having a base 44 and a side wall 45 to receive a packing ring or washer 46. This member 40, however, preferably does not have a baffle for the conduit 41 but is open at its end 43 in the axial line of the conduit. At its other end 48, the member 40 has an elbow 49 to which a hose or pipe line (not shown) from a source of supply may be connected, as at 50. Fixed on the elbow 49 is an eyelet 51 to which a supporting member may be connected to hold the fitting at the desired height. A handle 52 may be attached by threaded engagement, or otherwise, to a boss 53 on the elbow 49.

The operation of my device is as follows: A radiator, indicated at 54, Fig. 1, or any other hollow article or body to be tested, having two ports 55, 56, serving as inlet and outlet, is suitably supported, preferably by overhead suspension (not shown), so that it may be properly inspected. The ends 31, 43, respectively, of conduit members 29, 40, are inserted, one in each of the ports 55, 56. The hooks or fastening members 21 of both the head and the plug fitting are engaged behind a section of the radiator, see Fig. 1, and are locked in position by turning each of the cam wheels 24 up on the sleeves 9 until the conical portions 25 abut hard against the cam surfaces 23. Each fitting is now locked to the radiator or body under test. In order to seal the joints respectively at ports 55, 56, the wheels 6 on the head and the plug are revolved in a clockwise direction, and as the internal threads in the supports 2 and 2ª are left-hand, the conduit members 29 and 40 will be advanced to press the washers or packing rings 34 and 46 tight against the respective ends of the radiator. It is of course evident that the conduit members themselves will not be rotated, and that the supports 2 and 2ª will rotate in their sleeves 9. When the valve 38 has been closed, the test fluid, such as water, under desired test pressure, is turned on by opening a valve (not shown) in the supply line to the head conduit 41 from the source of supply. The fluid will enter the radiator or body 54 through the conduit 41 of the head fitting and be retained therein by the closed valve 38. When the article or body under test has been inspected for leaks, the fluid from the source of supply is turned off and the valve 38 opened to drain the body 54. As the fluid leaves the radiator or body, it must pass around and under the baffle 35, which will cause the current to carry out with it any foreign material, such as core sand, or the like, which has been deposited within the radiator along its bottom. The test having been completed, the head and plug fittings are unclamped from the tested article and the article removed, whereupon other articles may be tested in turn.

What I claim and desire to secure by Letters Patent of the United States is:—

1. A testing device comprising a support having a conduit member movable relative thereto, pivot means rotatable on said support, fastening means fulcrumed on said pivot means, and means for causing relative movement of said conduit member and said support.

2. A testing device comprising a support having a conduit member movable relative thereto, pivot means rotatable on said support, fastening means fulcrumed on said pivot means, and a locking member adjustably carried on said pivot means to fix said fastening means in adjusted position.

3. A testing device comprising a support, a conduit member threaded through said support for longitudinal movement, means to move said conduit member relative to said support, fastening members fulcrumed on said support, and means adjustable on said support adapted to engage said fastening members.

4. A testing device comprising a support, a conduit member threaded through said support for longitudinal movement, means to move said conduit member relative to said support, pivot means rotatable on said support, fastening means fulcrumed on said pivot means, and an abutment threaded on said pivot means and adapted to be moved into engagement with said fastening means.

5. A testing device comprising a support having a conduit member, fastening means carried by said support, a peripheral shoulder on said member, said conduit member having an opening through the side wall thereof beyond said shoulder, and a baffle closing the end of said conduit member beyond said opening.

6. A testing device comprising a support having a conduit member mounted for longitudinal movement therein, fastening means adjustable on said support, means to lock said fastening means in adjusted position, a shoulder on said conduit member adjacent one end thereof, a baffle across the end of said conduit member, and said conduit member having an opening thereinto between said baffle and said shoulder.

7. A testing device comprising a support having an internal thread, a conduit member threaded in said support, a sleeve rotatable on said support, fastening members carried by said sleeve, means for rotating said support and conduit member relative to each other, and means on said sleeve for operating said fastening members.

8. A testing device comprising a support having an internal thread, a conduit member threaded in said support, a sleeve rotatable on said support, fastening members carried by said sleeve, means for rotating said support and conduit member relative to each other, and means threaded on said sleeve for operating said fastening members.

9. A testing device comprising a support having an internal thread, a conduit member threaded in said support, a sleeve rotatable on said support, fastening members carried by said sleeve, means for rotating said support and conduit member relative to each other, and cam means threaded on said sleeve for operating said fastening members.

10. A testing device comprising an internally threaded supporting member, a conduit threaded in said supporting member and having at one end a sealing head, a sleeve rotatably mounted on said supporting member, hook members fulcrumed on said sleeve, and a cone disc threaded on said sleeve and adapted to engage the hook members to operate the same.

11. A testing device comprising a support, a conduit member threaded through said support and having a conduit therein opening through a side wall of said member adjacent one end thereof, a baffle closing the end of said conduit beyond said opening, a peripheral shoulder on said conduit member between said opening and said support, means to move said conduit longitudinally relative to said support, a sleeve rotatable on said support, said sleeve having a plurality of pins, fastening members fulcrumed on said pins, said fastening members having cam surfaces overlying said sleeve, and a cam wheel threaded on said sleeve for engagement with said cam surfaces.

In testimony whereof I have hereunto subscribed my name.

GLEN W. PRICE.